(No Model.)
H. LUCAS.
LOZENGE MACHINE.
No. 521,660. Patented June 19, 1894.
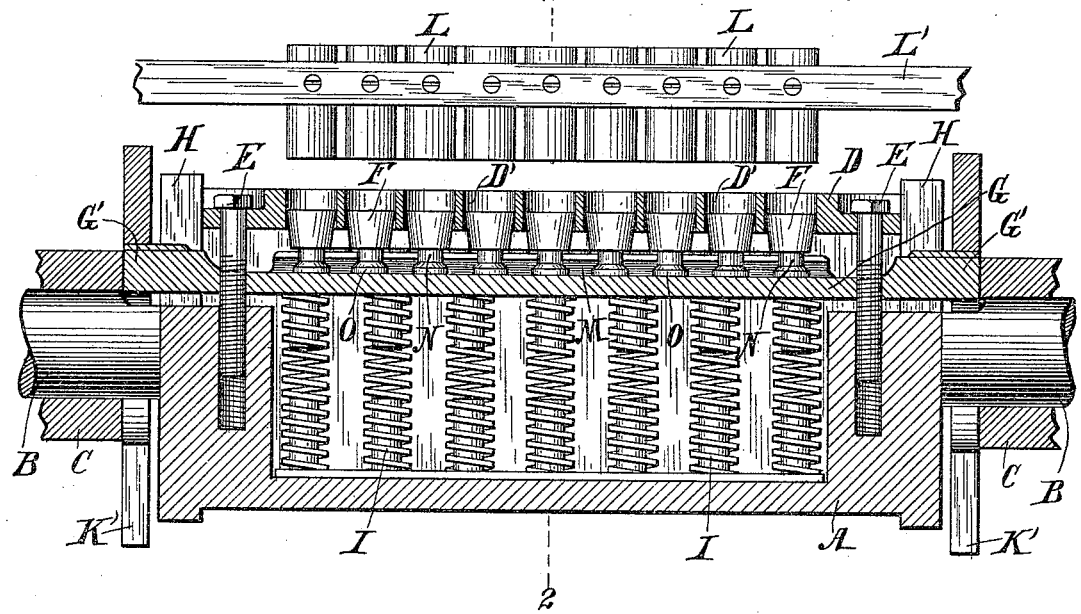
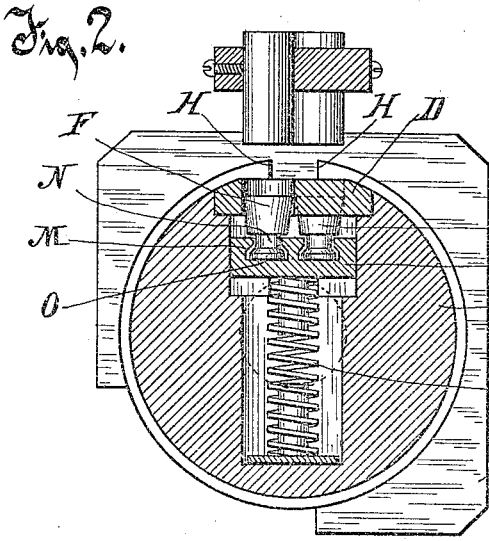
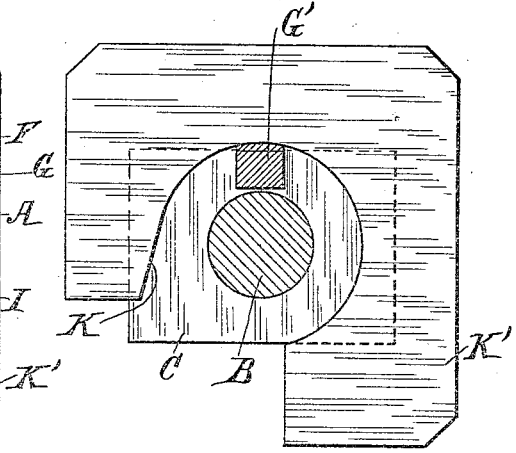
Witnesses.
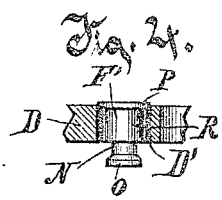
Inventor.
Henry Lucas
By Benedict & Morsell
Attorneys.

UNITED STATES PATENT OFFICE.

HENRY LUCAS, OF LAKE, ASSIGNOR TO THE GEORGE ZIEGLER COMPANY, OF MILWAUKEE, WISCONSIN.

LOZENGE-MACHINE.

SPECIFICATION forming part of Letters Patent No. 521,660, dated June 19, 1894.

Application filed November 13, 1893. Serial No. 490,788. (No model.)

*To all whom it may concern:*

Be it known that I, HENRY LUCAS, of the town of Lake, in the county of Milwaukee and State of Wisconsin, have invented a new and useful Improvement in Lozenge-Machines, of which the following is a description, reference being had to the accompanying drawings, which are a part of this specification.

My invention relates to that class of machines adapted to cut lozenges or crackers or analogous articles from a sheet of paste, dough or plastic material, and imprint them, in which machines reciprocating punches are used.

The invention has particular relation to machines for the above purpose in which a cylinder is employed, said cylinder provided with a recess, in which recess a stock and matrix are carried, the former located below or behind the latter, and mounted movably in the recess, and carrying a series of punches, and the latter carried rigidly in the recess by means of screws or equivalents, engaging the solid portion of the cylinder.

The particular class of machines above described are open to several objections. In the first place, as ordinarily constructed, the matrix clearing punches are so constructed that the matrix openings soon become clogged with the adhering paste to such an extent as to seriously impair an efficient working of the punches, and the consequent necessity of frequently removing the parts within the recess so as to obtain access to the matrix and punches for cleaning purposes; and, in the second place, when such parts are removed, their removal is accomplished only after considerable difficulty and loss of time, it being necessary, in order to remove the punches, to entirely remove the stock.

It is the object of my invention, in the first place, to provide a construction wherein the necessity of such frequent cleaning is obviated, and, in the second place, when a cleaning finally becomes desirable, to provide for the ready and convenient removal of the punches, with only the necessity of taking out the matrix.

The invention consists in the devices hereinafter specifically described and claimed, or their equivalents.

A lozenge machine in which my invention is conveniently embodied, consists in a general way of a table having means, as endless belt aprons, for delivering sheets of paste to the cutting and imprinting devices, a revolving cylinder located in and flush with the top of the table, transversely thereof, which cylinder is provided with a matrix-containing plate and reciprocating clearing punches, (which usually serve also as printing dies,) and reciprocating cutting punches located opposite to the cylinder, and so disposed as to register with the matrices in the cylinder when in the revolution of the cylinder these matrices are brought directly opposite and adjacent to the reciprocating punches. In the drawings, I have shown only so much of such a machine as is necessary to illustrate the relations and functions of my improved devices to and in a lozenge machine.

The machine, in which my improved devices can be successfully used, need not be specifically of the form I have shown, and described in a general way, except in so far as those parts are concerned that are involved in my invention.

In the drawings, Figure 1, is a central longitudinal section of the cylinder of a lozenge machine having a matrix plate, and in and with which my improved clearing punches and their stock are embodied, and cutting punches shown in elevation above and in proper relation to the cylinder and matrix plate. Fig. 2, is a transverse section of the devices shown in Fig. 1 on line 2—2 thereof. Fig. 3, is a detail showing the cam by which the clearing punches are retrieved and held against the action of springs. Fig. 4, shows a modified form of a clearing punch.

The cylinder A is provided with journals B having bearings in the boxes C which are fixed in the table or other suitable support. A matrix plate D substantially as long as the cylinder A is seated in a recess therefor in the cylinder, and is held permanently in place by screws E that turn into the cylinder. The plate D is provided with a number of transverse apertures D' of equal diameter, but of such shape in cross section as desired (here shown as cylindrical), which apertures are preferably arranged in one or more longitudinal series, which apertures become and are used as the lozenge matrices. These matrices are each provided with a clearing punch F reciprocative therein, which is detachably footed and held in a frame or stock G. The stock G consists of a bar somewhat longer than the cylinder A and is located longitudinally of the cylinder in a recess therefor, below or behind the matrix-plate D. The stock G is reciprocative radially, in the radial plane of the matrix-plate D, it being guided in such motion by its extremities G' which move in radial recesses therefor formed in the ends of the cylinder, the walls H of which recesses serve as guides therefor. The screws E pass loosely through the stock G. Springs I, interposed between the stock G and an opposite wall of the recess in the cylinder in which recess the stock and the springs are located, serve to force the stock yieldingly toward and against the plate D. The stock G is retrieved and held back against the action of the springs I, in the position shown in Fig. 1, during a large portion of the revolution of the cylinder A by means of the cams K cut in the plates K' secured fixedly to the boxes C. The extremities G' of the stock G during most of the revolution of the cylinder, ride in, and, under the resilient action of the springs I, bear radially outwardly against the cams K, being only released therefrom briefly when the plate D is at or near the bottom, in the revolution of the cylinder A, at which point, the cam being broken away, the stock escapes therefrom and is forced outwardly radially by the springs to and against the plate D carrying the clearing punches with it through the plate, thus discharging the lozenges from the matrices. The cutting punches L are located opposite the cylinder A, and are of the same form in cross section as the apertures D', with which they are arranged to register and into which they are constructed to fit. These punches are supported in a suitable frame L' which is so mounted, as to be reciprocative toward and from the cylinder, at certain prescribed intervals. The cutting punches L and the clearing punches F each have sharp well defined terminal edges opposed to each other, and usually the faces of these opposing ends of the cutting and clearing punches are provided with intaglio dies, adapted to imprint the lozenges formed between them.

It will be seen by the construction already described that the clearing punches F when in the positions shown in Fig. 1 form the bottoms of the molds or matrices, in which the lozenges are formed, the paste being forced into the matrices and the lozenges cut therefrom by the reciprocative action of the punches L. After the punches L are withdrawn and the cylinder A has revolved so that the stock G is released from the cam K, the springs I force the stock outwardly radially until it strikes the plate D, carrying the punches F with it and thereby discharging the lozenges from the matrices. However, as the paste of which the lozenges are made is exceedingly viscid and is apt to stick and adhere tenaciously to the walls of the apertures in the plate D, great trouble has been experienced, and most machines of this character have been abandoned, by reason of the inability to successfully operate them for more than a short time, without having to take the machine apart to clean the matrix plate. To overcome this difficulty I tried numerous experiments, but finally conceived and adopted the plan of constructing the clearing punches F with a considerable taper inwardly, from their upper or outer ends downwardly, so as thereby to present a sharp or acute angular edge at the extremity of the punch, and to provide a considerable clearance from its outer end and thence along the punch, between it and the walls of the matrix apertures in the matrix plate. This form of device operates successfully and enables me to perform work continuously with the machine, whereas heretofore only a small amount of work could be performed without taking the machine apart to clean it as before stated, resulting in such expense of operation as practically to make the machine a complete failure.

It will be readily understood that in a lozenge machine in which the stock, punches, and matrix are arranged within a recessed cylinder, it is very difficult to obtain access to the parts for cleaning purposes, and hence where it is necessary to frequently clean such parts, trouble and expense in operating are materially increased.

To attach the punches F to the stock G satisfactorily and so as to be conveniently removable therefrom, I provide a dove-tailed groove or grooves M in the stock G and construct the punches F with a neck N and an expanded foot O, whereby the punches can be inserted in the stock from one end, when the matrix plate D is removed, but are held thereto against escape therefrom, at a right angle to the stock, or radially of the cylinder in which the stock is mounted. In other machines in which the stock, punches, and matrix are carried in a recess in the cylinder, the stock is usually provided with an elongated opening which receives the reduced lower ends of the punches, said reduced lower ends having threaded sockets for the reception of screws inserted beneath the stock, said screws carrying shoulders or collars which bear against the under side of said stock. It is obvious that in this construction, when it is desired to remove the punches, it is necessary to entirely remove the stock in order to get access to the screws beneath said stock, an operation obviously involving considerable labor and time. In my construction, however, by providing the groove or grooves M in the stock G, and constructing the punches so as to be held in the grooves and freely movable therein, this difficulty is entirely obviated, and I am enabled to readily withdraw the punches for effectually cleaning, or when it becomes necessary to replace worn punches with new ones.

In the modified form shown in Fig. 4 I illustrate a clearing punch F' which instead of tapering from its face end to the neck N, is provided with a head P substantially as large in cross section as the matrix aperture, which head is of quite limited thickness, longitudinally of the punch and which is abruptly contracted to a body part R of less diameter than the head P, thus providing for the necessary clearance between it and the matrix plate. This form of punch is not, however, so desirable as the form shown in Figs. 1 and 2.

Having thus described my invention, what I claim, and desire to secure by Letters Patent, is—

1. In a lozenge machine, the combination, of a revoluble cylinder having a recess therein, a radially movable stock within the recess, said stock provided upon its outer side with an open ended groove, punches having their lower ends retained in said groove, and adapted to be slid longitudinally along the groove, so as to pass out of the open ends thereof when the matrix plate is removed, and a matrix plate fixed to the cylinder within the recess thereof, said plate provided with matrix openings in which the punches are adapted to reciprocate, substantially as set forth.

2. In a lozenge machine, the combination, of a revoluble cylinder having a recess therein, a radially movable stock within the recess, said stock having a dovetailed or interiorly expanded open-ended groove, punches provided with contracted necks and expanded feet, which feet fit in the dovetailed groove of the stock, and are adapted to be slid longitudinally along the groove so as to pass out of the open ends thereof, and a matrix plate secured detachably within the recess of the cylinder, said plate provided with matrix openings in which the punches are adapted to reciprocate, substantially as set forth.

3. In a lozenge machine, the combination, of a revoluble cylinder having a recess therein, a radially movable stock within the recess, said stock provided upon its outer side with an open ended groove, a matrix plate detachably secured within the recess of the cylinder said plate having matrix apertures therein, and punches, each punch having a sharp edge at its front or head end, and a contracted or tapering body of less diameter than the matrix aperture, and also having its lower end retained in the groove of the stock, and adapted to be slid longitudinally along said groove so as to pass out of the open ends thereof when the matrix plate is removed, substantially as set forth.

In testimony whereof I affix my signature in presence of two witnesses.

HENRY LUCAS.

Witnesses:
C. T. BENEDICT,
ARTHUR L. MORSELL.